May 9, 1933.  E. SOMMER  1,908,272
EQUIPMENT AND METHOD FOR TESTING ELECTRICAL
COILS AND FOR TRIMMING THE LEADS THEREOF
Filed April 7, 1930
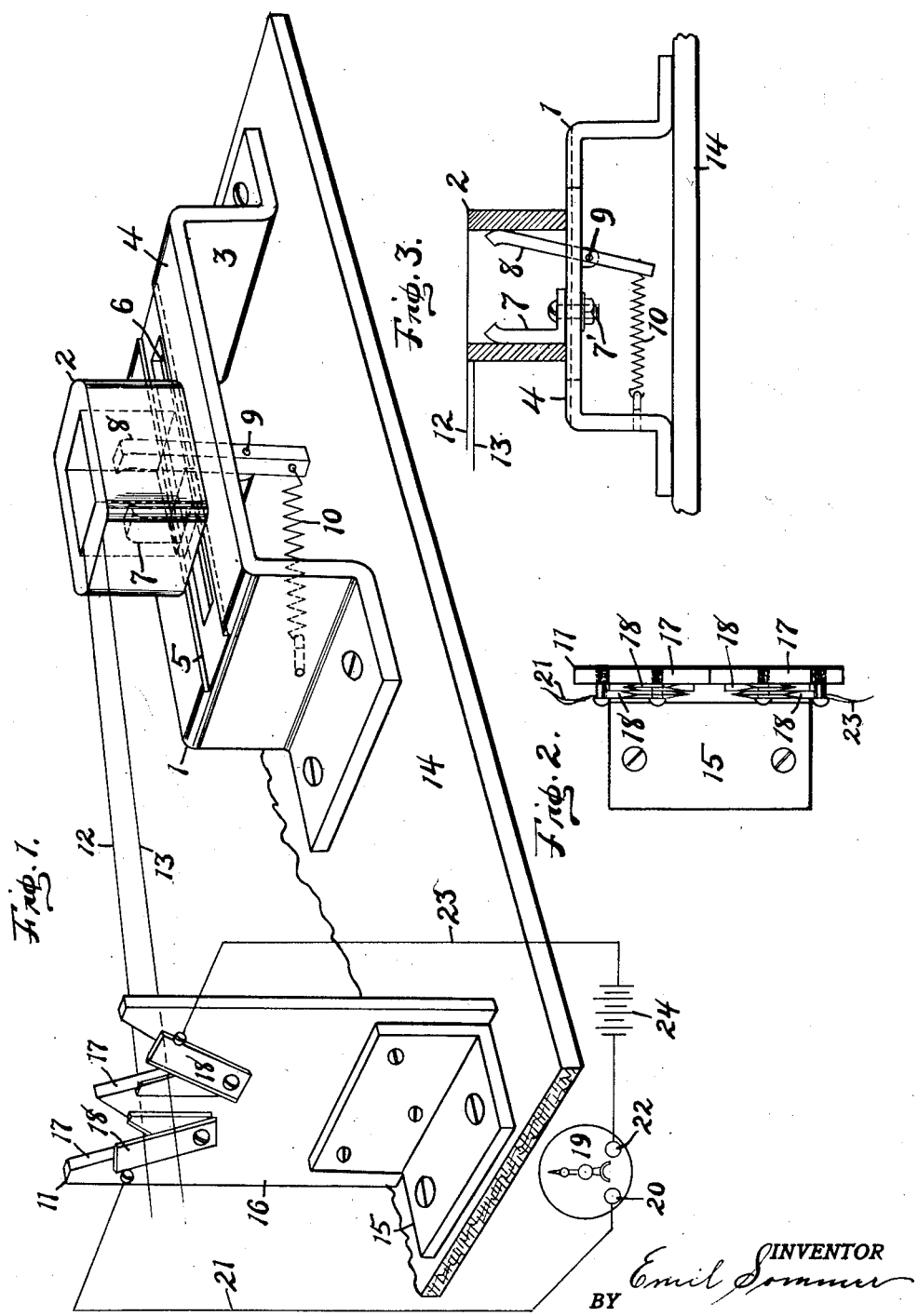
INVENTOR
Emil Sommer
BY
H. G. Burns ATTORNEY Patented May 9, 1933

1,908,272

UNITED STATES PATENT OFFICE

EMIL SOMMER, OF FORT WAYNE, INDIANA, ASSIGNOR TO GENERAL CABLE CORPORATION, OF NEW YORK, N. Y., A CORPORATION OF NEW JERSEY

EQUIPMENT AND METHOD FOR TESTING ELECTRICAL COILS AND FOR TRIMMING THE LEADS THEREOF

Application filed April 7, 1930. Serial No. 442,132.

This invention relates to improvements in an equipment and a method for testing electrical coils and for trimming the terminal leads of the coils. It is an object of the invention to provide apparatus whereby the operations of testing coils for continuity of circuit and of trimming the leads to predetermined lengths may be performed in a single operation. Another object is to provide an improved method of testing electrical coils and trimming the leads thereof in such manner as to economize the time and effort of the artisan in performing the required operations. Other objects and advantages of the invention will appear hereinafter.

An illustrative embodiment of the invention is shown in the accompanying drawing, in which:—

Fig. 1 is a perspective view of the appliance, including the mount for the coils, a coil positioned thereon, and the electrical contacting and trimming device for the leads of the coils, there being also shown in diagrammatic form the electrical connections for the contacting means;

Fig. 2 is a plan view of the electrical contacting and lead trimming device; and Fig. 3 is a side elevation of the mount for the coils, there being shown in section also a coil positioned on the mount.

The appliance illustrated in the drawing includes a mount 1 for supporting a coil 2 during the electrical testing and lead-trimming operations. The mount is comprised of a base 3, the top 4 of which conveniently has a longitudinal guide-way 5, and also an elongated aperture 6 located between the sides of the guide-way. A stop 7 is seated in the guide-way, extends upwardly from the base 3, and is secured, as by means of a bolt 7' that extends through the foot of the stop and the aperture in the base, so as to afford longitudinal adjustment of the stop with respect to the base.

A finger 8 extends vertically through the aperture 6 and preferably is mounted upon a pivot 9 in connection with the base. The lower end of the finger is connected with the base, as by means of a contracting spring 10, and the upper end of the finger is disposed in a position opposite the stop, and tends to swing away from the stop under the influence of the spring 10. The upper ends of the stop 7 and finger 8 are preferably bent toward each other so that in placing a coil 2 in position upon the base, with the stop and finger protruding into its bore, damage to the lower end of the coil by the ends of the stop and finger is obviated. The action of the finger 8 against the inner face of the coil body 2 tends to hold the coil body with its opposite inner face against the stop 7. By adjustment of the stop longitudinally upon the base, the stop may be spaced from the finger conveniently to accommodate coils, the bores of which vary in dimensions.

A lead-severing or trimming device 11 is positioned adjacent one end of the coil holder at a point spaced a suitable distance therefrom, according to predetermined lengths to which the terminal leads 12—13 of the coil are desired to be trimmed, the coil holder and the trimming device being mounted, conveniently, and in any suitable manner, upon a common support, such as a bench 14.

The lead-trimming device which is shown by way of illustration includes a base 15 to which is secured a rigid vertical plate 16, conveniently of insulating material such as fibre, and having in its upper end a pair of spaced notches 17. Upon the plate 16, adjacent each notch 17, is secured a lead-cutting device, each conveniently consisting of a pair of divergently disposed blades 18, the inner edges of which are sharpened and overlap the corresponding edges of the notch and present an unobstructed sharp crotch formed by the intersecting sharpened edges of the blades.

The plate 16 is positioned preferably in a plane substantially at right angles to the base 3 of the coil holder, with respect to the length thereof, so that the coil leads 12—13, when drawn taut and pulled downwardly into the corresponding crotches, will extend at substantially right angles to the blades 18.

Associated with the lead-trimming device is means for testing the continuity of circuit of the coil at the same time that the coil leads are being severed. Conveniently, this means comprises a galvanometer or other electrical current indicating instrument 19, one terminal 20 of which is connected by means of a conductor 21 with a contactor comprising one pair of the blades 18, and the other terminal 22 of which is connected by means of a conductor 23 through any suitable source of electrical energy, such as a battery 24, to another contactor comprising the other pair of blades 18. In practice, the indicating instrument 19 will be positioned so as to permit of convenient observation by the artisan.

In operation, the coils to be tested are individually placed endwise upon the base 1 so as to encompass both the stop 7 and the finger 8, where the coil 2 is held against the stop by the pressure of the finger against its inner wall. The leads 12 and 13 are extended, respectively, over the notches 17 in the upper edge of the plate 16 of the trimming device, and then are lowered into the crotches of the corresponding cutting members, which members are insulated from each other by the fibre plate 16. The outer ends of the leads are then drawn firmly downward, whereupon electrical contact is made between the blades 18 and the corresponding leads by the action of the blades in cutting through the insulation on the leads. In this manner an electrical circuit is established through the coil 2, the battery 24, and the galvanometer 19, provided that the winding of the coil has been properly made so as to permit flow of current therethrough, and the artisan is apprised of the establishment of the flow of current through the coil by activity of the galvanometer, or of defectiveness of the coil by inactivity of the galvanometer.

Following the above described testing operation, while the coil is still positioned on the holder and its leads are drawn taut and lie in the crotches of the blades, the extending ends of the leads are jerked downwardly by the artisan with such force that the blades cut through and completely sever the leads at their points of contact therewith. In this manner the leads of the coils will be trimmed to a uniform length.

In assembling the coil holder and the trimming device, they are spaced apart and secured in place, as upon the bench, the spacing being adjustable and predetermined according to the lengths to which it is desired to trim the leads.

The method herein set forth may be applied in the manufacture of electrical coils in large quantities, and is advantageous in that defective coils, that is, those having a discontinuous circuit or incapable of withstanding the flow therethrough of electrical current of predetermined value, may be readily detected and discarded, and furthermore, for the reason that the leads of the coils are trimmed to the desired length during the testing operation. Thus, uniformity is attained with respect to the required efficiency of the coils and to the lengths of their leads.

While the invention has been described with particular reference to the illustrative embodiment, it will be understood that the invention may be variously modified and embodied within the scope of the claims.

I claim:

1. An equipment for testing electrical coils and for trimming the terminal leads thereof, comprised of a coil holder; a lead-trimming device mounted in spaced relation with said holder and having two cutting members insulated from each other adapted for severing the leads of a coil positioned on the holder; a source of electrical energy; an electrical current-indicating instrument; and conductors connecting said source, instrument and cutting members, so arranged that a closed electrical circuit is established through said coil and instrument when contacts are made between the leads of the coil and corresponding cutting members.

2. An equipment for testing electrical coils and for trimming the terminal leads thereof, comprised of a coil holder; a lead-trimming device spaced from said holder and having two lead-cutting members insulated from each other, to which members the leads of a coil positioned on said holder are respectively applicable so as to have electrical contact therewith and to be severed thereby; and electrical means operably related with said members by which current is supplied to said coil and the flow thereof indicated when contacts are made between the leads of said coil and the corresponding lead-cutting members.

3. An appliance for testing electrical coils and trimming the terminal leads thereof, comprised of a lead-trimming device having two lead-cutting members suitably supported and insulated from each other; a source of electrical energy; an electrical current indicator; and conductors connecting said source, indicator and said members, so arranged that when the leads of a coil are placed into contact respectively with said members current is supplied to the coil and the flow thereof indicated.

4. An appliance for testing electrical coils and for trimming the terminal leads thereof, comprised of a lead-trimming device having two lead-cutting members suitably supported and insulated from each other; and electrical means operably related with said members so that when the leads of a coil are placed into contact respectively with said members current is supplied to the coil and the flow thereof indicated.

5. In an appliance of the class described, the combination of a coil holder; an insulating support spaced a predetermined distance from said holder; lead-cutting members separately secured on said support; and an electrically energized indicating means in connection with said members, said members being adapted to form electrical contacts respectively with the leads of a coil and thereby connect said coil in the electrical circuit of said means, and to sever said leads when said leads are forcefully applied thereto.

6. In an appliance of the class described, the combination of lead-cutting members suitably supported and insulated from each other, and an electrically energized indicating means in connection with said lead-cutting members, said members being adapted to form electrical contacts respectively with the leads of a coil and thereby connect said coil in the electrical circuit of said means, and to sever said leads when said leads are forcefully applied thereto.

7. An appliance for testing electrical coils and for trimming the leads thereof, comprising, in combination, two lead severing devices insulated electrically from each other, a source of electricity, current-flow indicating means, conductors connecting the source and indicating means in series between the two lead severing devices, and means for positioning a coil at a predetermined distance from the lead severing devices.

8. In the manufacture of electrical coils, the method which comprises severing the coil leads to predetermined lengths, and simultaneously with the severing operation applying electrical potential momentarily to said leads at the points of severance to ascertain the electrical continuity of the coil from which said leads extend.

In testimony whereof I affix my signature.

EMIL SOMMER.